United States Patent [19]

Whitaker

[11] 4,151,377

[45] Apr. 24, 1979

[54] HIGH IMPEDANCE LOOP-SEIZING AND DIAL PULSING CIRCUIT

[75] Inventor: Donald E. Whitaker, Jackson, Tenn.

[73] Assignee: International Telephone and Telegraph Corporation, New York, N.Y.

[21] Appl. No.: 866,781

[22] Filed: Jan. 3, 1978

[51] Int. Cl.² .................. H04M 3/02; H04L 25/02
[52] U.S. Cl. .................... 179/84 R; 179/18 FA
[58] Field of Search .............. 179/18 FA, 77, 84 A, 179/84 R, 81 R, 99; 307/297

[56] References Cited

U.S. PATENT DOCUMENTS

| 3,588,672 | 6/1971 | Wilson | 307/297 |
| 3,867,567 | 2/1975 | Herron et al. | 179/84 A |
| 3,953,683 | 4/1976 | Gabrielson | 179/84 A |
| 4,063,045 | 12/1977 | Greischar | 179/84 R |

FOREIGN PATENT DOCUMENTS 2234716  1/1975  France ................... 179/18 FA

Primary Examiner—Thomas A. Robinson
Attorney, Agent, or Firm—James B. Raden; Donald J. Lenkszus

[57] ABSTRACT

An improved loop-seizing and dial pulsing circuit arrangement of the type employed in telephone trunks has an extremely low insertion loss. The circuit comprises a diode bridge connected across a telephone loop and a controlled constant current source connected across the bridge. A current limiting diode also referred to as a constant current diode is used to establish a bias current for the constant current source.

13 Claims, 1 Drawing Figure

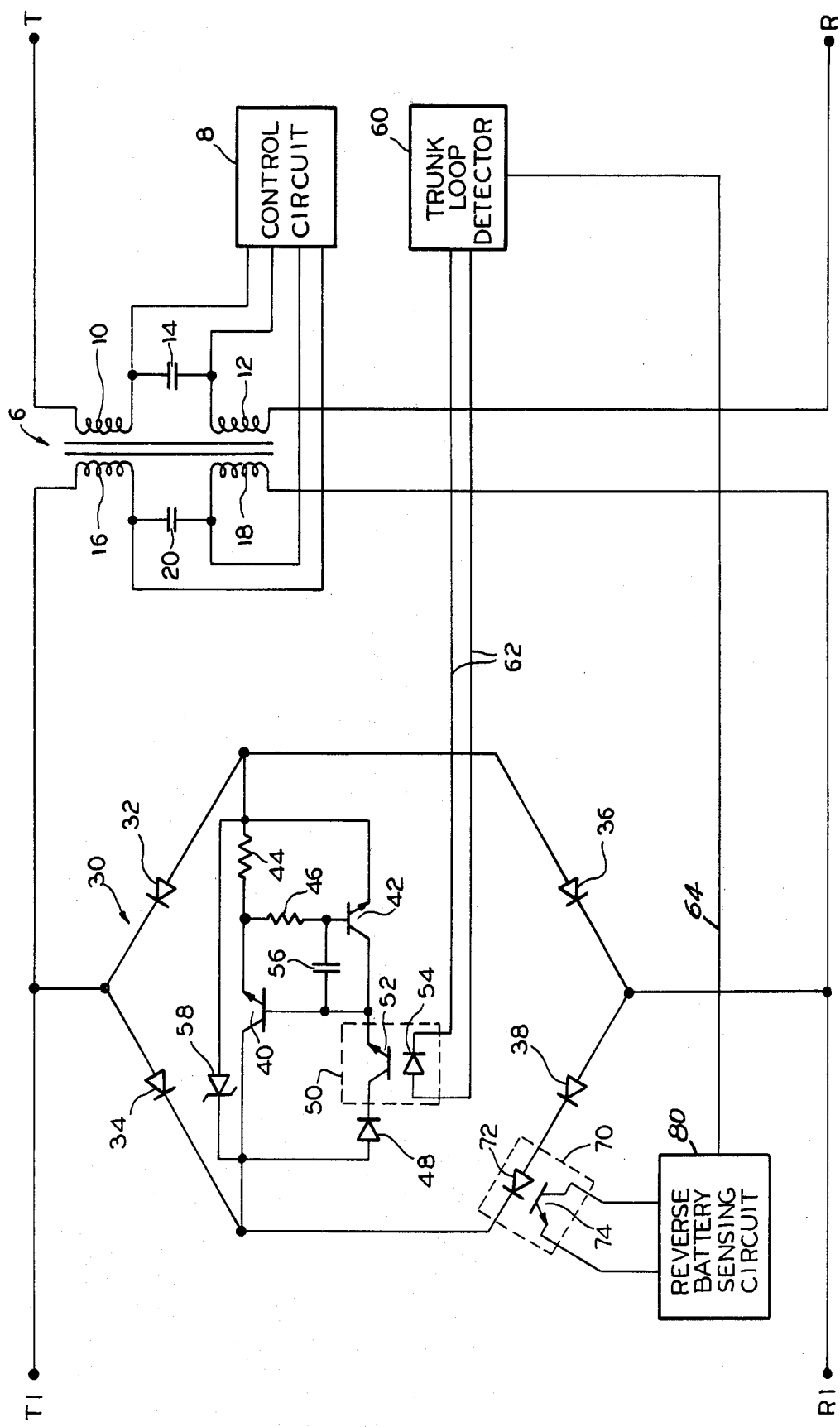

HIGH IMPEDANCE LOOP-SEIZING AND DIAL PULSING CIRCUIT

BACKGROUND OF THE INVENTION

1. Field of the Invention

This invention relates to a loop-seizing and dial pulsing circuit having a high impedance and of a type used in telephone trunk circuits.

2. Description of the Prior Art

Trunk circuits are commonly employed in telephone systems to provide a two-way signaling, supervision and transmission path between a central office connected to the trunk circuit and a distant office connected to the trunk circuit via a transmission facility.

For example, one type of trunk circuit used to provide two-way signaling and supervision between an office of the step-by-step type with a distant office operates as follows. For an incoming call from the distant office, the trunk is seized when the distant office closes the loop on the trunk tip and ring leads generally designated as T and R. The trunk circuit detects the loop closure and repeats the seizure by enabling a loop seizure circuit which in turn provides a current limited loop closure toward the step-by-step office on tip and ring leads generally designated as T1 and R1 which connect to the step-by-step office. Wink start may be returned to the distant office as a loop reversal on the leads T and R. Dial pulses transmitted from the distant office will be detected by a loop detector circuit which in turn controls the loop-seizing circuit to repeat the pulses to the step-by-step office. The trunk circuit recognizes answer supervision from the step-by-step office as a loop reversal on the leads T1 and R1 and repeats the supervision with a loop reversal on leads T and R toward the distant office. A transformer coupled voice path is then established and conversation between the calling and called parties may commence.

In such a trunk circuit as described above, the loop-seizing circuit must be arranged to operate with opposite polarities on its inputs to provide two-way signaling capability. Furthermore, it must provide a current limited direct current path between its input leads.

In one prior such trunk circuit, the loop-seizing circuit comprises a full wave diode bridge across the tip and ring leads. A conventional two transistor constant current source utilizing a resistor to provide base current bias is connected across the diode bridge. An optical isolator comprising a phototransistor connected in series with the above mentioned bias resistor and a light emitting diode coupled to the phototransistor is used to control the constant current source. A second opto-isolator having its light emitting diode connected between the diode bridge and the ring lead is used to detect loop reversals.

One problem with the prior art loop-seizing circuit is that a relatively low impedance path is provided for A.C. signals. For example, in such a prior art circuit employing a base biasing resistor insertion loss has been measured at between 0.2 db and 0.5 db.

A further problem with the prior art circuit is that a high gain transistor must be used because base current will decrease as loop resistance increases.

SUMMARY OF THE INVENTION

An object of the invention is to obtain low insertion loss.

A loop-seizing circuit in accordance with the principles of the invention includes a full wave diode bridge having two terminals connected to the tip and ring leads and a constant current source connected between the remaining two terminals. The constant current source includes a current regulating diode, sometimes referred to as a current limiting diode or constant current diode, to establish a bias current for the constant current source.

BRIEF DESCRIPTION OF THE DRAWING

The nature of the present invention and a better understanding of its operation will be had from a reading of the following detailed description taken in conjunction with the accompanying drawing in which the single FIGURE illustrates in partially schematic and partially block diagram form a two-way loop trunk utilizing a loop-seizing circuit in accordance with the principles of the invention.

DESCRIPTION OF THE PREFERRED EMBODIMENT

The trunk circuit illustrated in the FIGURE is typically located at a central office of the step-by-step type and may be employed as an incoming or outgoing trunk circuit. The tip and ring terminals T and R, respectively, are connected to a trunk which is in turn connected to a distant central office. The tip and ring terminal pairs T1 and R1 are connected to the step-by-step office.

The transformer 6 comprising the windings 10, 12, 16 and 18 is of a type commonly used in telephone trunk circuits and has capacitors 14 and 20 which are respectively serially connected between the windings 10 and 12 and 16 and 18. The control circuit 8 includes a battery feed relay and other circuitry of a type known in the art for selectively reconfiguring the connections to the transformer 6 so that the trunk circuit may be connected either as an incoming or outgoing trunk circuit.

A loop-seizing circuit indicated generally at 30 is connected in shunt across the windings 16 and 18. The loop-seizing circuit includes the diodes 32, 34, 36 and 38 connected as a full wave bridge with the junction between the diodes 32 and 34 connected to the winding 16 and the junction between the diodes 36 and 38 connected to the winding 18. A constant current source is connected across the diode bridge between the junctions formed between the diodes 32 and 36 and between the diodes 34 and 38. The constant current source includes transistors 40 and 42. The transistor 40 has its collector connected to the junction between diodes 34 and 38 and its emitter connected through the resistor 44 to the junction between the diodes 32 and 36. A constant current diode 48 of a type known in the art has its anode connected to the junction between the diodes 34 and 38 and its cathode coupled to the base of the transistor 40 through a phototransistor 52 of an optical coupler 50. A constant current diode is a circuit element that provides a current essentially independent of voltage. The optical coupler 50 includes a light emitting diode 54 coupled to the phototransistor 52 and connected via 62 to a trunk loop detector circuit. The optical isolator 50 operates as a controlled switch to activate or deactivate the constant current source. The second transistor 42 of the constant current source has its collector connected to the base of the transistor 40, its emitter connected to the junction between the diodes 32 and 36 and its base connected to the emitter of the transistor 40 through a resistor 46.

In operation, the constant current source is controlled by the trunk loop detector 60. When no signal is applied by the trunk loop detector 60 to the leads 62, the light emitting diode 54 is not energized and consequently, the phototransistor 52 is in a non-conductive state thereby preventing current from flowing to the base of the transistor 40. Under these circumstances, the constant current source is in a non-conducting state. When the trunk loop detector 60 applies a signal to the leads 62, the light emitting diode 54 is turned on, thereby causing phototransistor 52 to assume the conductive state. The constant current diode 48 then supplies approximately 1 ma. of current to the base of the transistor 40. The transistor 40 is biased in its active region of conduction and the constant current source provides a current limited path. The constant current source provides a current of approximately ($V_{BE}/R$) where $V_{BE}$ is the base-emitter voltage of the transistor 42 and R is the resistance value of resistor 44. In this embodiment, $V_{BE}=0.6$ volts and R was chosen to yield a constant current of 25 ma.

A capacitor 56 is connected between the base leads of the transistors 40 and 42 to prevent high frequency oscillations.

A zener diode 58 is connected in shunt across the constant current source to provide protection from excessive voltage levels.

The loop-seizing circuit further includes a second optical isolator 70 having a light emitting diode 72 connected in series with the diode 38. The light emitting diode is coupled to a phototransistor 74 which is in turn connected to a reverse battery sensing circuit 80. The operation of this circuit portion is described in greater detail below.

In the idle state, the constant current source is not energized. The control circuit includes means known in the art for indicating its idle state by applying a 200 ohm ground impedance on lead T and a 200 ohm battery impedance on lead R.

The distant office gains access to the trunk circuit by providing a loop closure on leads T and R. The trunk loop detector 60 detects this closure and turns on optical coupler 50 which in turn activates the constant current source thereby extending a current limited loop closure towards the step-by-step office on leads T1 and R1. The trunk loop detector 60 also applies a signal via line 64 to activate the reverse battery sensing circuit 80.

The distant office may then supply dial pulses. The trunk loop detector 60 detects the dial pulses and repeats them on the leads 62 thereby turning the constant current source on and off and thus alternately closing and opening the current limited loop on leads T1 and R1.

The step-by-step office may return answer supervision by reversing the leads T1 and R1. The optical isolator 70 detects this reversal and energizes the reverse battery sensing circuit 60 which in turn will operate a relay which is not shown to reverse the leads T and R. A talk path is then established between the leads T and R and T1 and R1 via the transformer 10.

When the calling party disconnects, the loop between leads T and R is opened. This open condition is detected by the trunk loop detector 60 which removes the signal from line 62 thereby deactivating the constant current source. The loop between the leads T1 and R1 is thus opened. The trunk loop detector also signals the reverse battery sensing circuit 60 to deactivate the reverse battery relay to restore the leads T and R to normal polarity.

The insertion loss of the circuit has been measured to be as low as 0.01 decibels.

What is claimed is:

1. In a loop-seizing circuit comprising:
   a plurality of diodes arranged as a bridge;
   a constant current source connected across said diode bridge, said constant current source comprising a transistor having a biasing terminal;
   the improvement comprising:
   a constant current diode having first circuit connections to said diode bridge and second circuit connections to said biasing terminal.

2. A loop-seizing circuit according to claim 1 further comprising controlled
   switching means connected to said constant current diode for selectively enabling and disabling said constant current source.

3. A loop-seizing circuit according to claim 2 wherein said controlled switching means includes an optical isolator serially connected to said constant current source.

4. A loop-seizing circuit according to claim 1 further comprising an optical isolator serially connected between two of such plurality of diodes for generating a reverse battery indication signal.

5. In a loop-seizing circuit comprising:
   first, second, third and fourth terminals;
   first, second, third and fourth diode means each respectively connected between said first and second terminals, said second and third terminals, said third and fourth terminals, and said fourth and first terminals;
   a constant current source connected between said first and third terminals,
   said constant current source comprising a transistor having a first, second, and base leads, first means for connecting said first lead to said first terminal and second means for connecting said second lead to said third terminal;
   the improvement comprising:
   a constant current diode;
   third means for connecting said constant current diode to said first terminal;
   and fourth means for connecting said constant current diode to said base lead.

6. A loop-seizing circuit according to claim 5 further comprising:
   controlled switching means for selectively enabling and disabling said constant current source.

7. A loop-seizing circuit according to claim 6 wherein said controlled switching means includes an optical isolator serially connected to said constant current diode.

8. A loop-seizing circuit according to claim 5 wherein said constant current source further comprises a second transistor having first, second and base leads;
   fifth means for connecting said second transistor first lead to said first transistor base lead;
   sixth means for connecting said second transistor second lead to said third terminal; and
   seventh means for connecting said second transistor base lead to said first transistor second lead.

9. A loop-seizing circuit according to claim 8 further comprising:

controlled switching means for selectively enabling and disabling said constant current source.

10. A loop-seizing circuit according to claim 9 wherein said controlled switching means includes an optical isolator serially connected to said constant current diode.

11. A loop-seizing circuit according to claim 9 wherein said second means includes a first resistor and said seventh means comprises a second resistor.

12. A loop-seizing circuit according to claim 8 further comprising:
capacitor means connected between said first and second transistor base leads.

13. A loop-seizing circuit according to claim 5 comprising an optical isolator serially connected with said second diode means for generating a reverse battery indication signal.

* * * * *